(12) United States Patent
He et al.

(10) Patent No.: US 9,099,689 B2
(45) Date of Patent: Aug. 4, 2015

(54) METHOD FOR MAKING CURRENT COLLECTOR

(71) Applicants: Xiang-Ming He, Beijing (CN); Li Wang, Beijing (CN); Jian-Jun Li, Beijing (CN); Jian Gao, Beijing (CN); Jian-Wei Guo, Beijing (CN)

(72) Inventors: Xiang-Ming He, Beijing (CN); Li Wang, Beijing (CN); Jian-Jun Li, Beijing (CN); Jian Gao, Beijing (CN); Jian-Wei Guo, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 108 days.

(21) Appl. No.: 13/717,879

(22) Filed: Dec. 18, 2012

(65) Prior Publication Data

US 2013/0305525 A1 Nov. 21, 2013

(30) Foreign Application Priority Data

May 17, 2012 (CN) .......................... 2012 1 0153299

(51) Int. Cl.
| | |
|---|---|
| *H01M 4/04* | (2006.01) |
| *H01M 2/00* | (2006.01) |
| *H01M 4/66* | (2006.01) |
| *H01G 11/68* | (2013.01) |
| *H01G 11/70* | (2013.01) |
| *H01G 11/84* | (2013.01) |
| *H01M 10/052* | (2010.01) |
| *H01G 11/28* | (2013.01) |

(52) U.S. Cl.
CPC ................ *H01M 2/00* (2013.01); *H01G 11/68* (2013.01); *H01G 11/70* (2013.01); *H01G 11/84* (2013.01); *H01M 4/663* (2013.01); *H01M 4/667* (2013.01); *H01G 11/28* (2013.01); *H01M 10/052* (2013.01); *Y02E 60/13* (2013.01); *Y10T 29/49112* (2015.01)

(58) Field of Classification Search
CPC ...... H01M 4/04; H01M 4/0404; H01M 4/663
USPC .......................................................... 29/623
See application file for complete search history.

(56) References Cited

U.S. PATENT DOCUMENTS

| | | | |
|---|---|---|---|
| 2007/0053168 A1* | 3/2007 | Sayir et al. ................... | 361/718 |
| 2009/0325071 A1 | 12/2009 | Verbrugge et al. | |
| 2010/0183920 A1* | 7/2010 | Shaffer et al. ................ | 429/210 |
| 2013/0045413 A1 | 2/2013 | Wang et al. | |

FOREIGN PATENT DOCUMENTS

| | | |
|---|---|---|
| CN | 101882480 | 11/2010 |
| CN | 102084522 | 6/2011 |
| CN | 102306800 | 1/2012 |
| WO | WO 2009/141691 | * 11/2009 |

* cited by examiner

*Primary Examiner* — Stewart Fraser
*Assistant Examiner* — Olatunji Godo
(74) *Attorney, Agent, or Firm* — Novak Druce Connolly Bove + Quigg LLP (57) ABSTRACT

A method for making current collector is described. In the method, a substrate, a graphene film, and a plastic support film are provided. The substrate has a surface. The graphene film is disposed on the surface of the substrate. The graphene film disposed on the surface of the substrate and the plastic support film are laminated to form a substrate-graphene-plastic support film composite structure. The substrate is removed.

11 Claims, 9 Drawing Sheets

METHOD FOR MAKING CURRENT COLLECTOR

CROSS-REFERENCE TO RELATED APPLICATIONS

This application claims all benefits accruing under 35 U.S.C. §119 from China Patent Application No. 201210153299.5, filed on May 17, 2012, in the China Intellectual Property Office, the contents of which are hereby incorporated by reference. This application is related to common-assigned application entitled, "CURRENT COLLECTOR, ELECTROCHEMICAL CELL ELECTRODE AND ELECTROCHEMICAL CELL" filed Dec. 18, 2012, Ser. No. 13,717,837.

BACKGROUND

1. Technical Field

The present disclosure relates to a method for making a current collector.

2. Description of Related Art

Current collectors are the main components of electrochemical cells. The current collectors are used as electron transfer channels for transferring electrons formed in electrochemical reactions of the electrochemical cells to an external circuit to provide electric currents. Performances of the electrochemical cells are affected by the performances of the current collectors.

The current collectors are usually made of metal foils, such as copper and aluminum foils. The metal foils are usually heavy in weight, thus the energy density of the electrochemical cells may be decreased. In addition, the metal foils are prone to corrosion; therefore the life expectancy of the electrochemical cells may be decreased.

What is needed, therefore, is to provide a method for making a current collector, which has a small weight and an excellent corrosion resistant.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Referring to FIGS. 1 to 4, one embodiment of a current collector 12 includes a plastic support film 122 and a graphene film 124 coated on at least one surface of a plastic support film 122.

Figure 1:
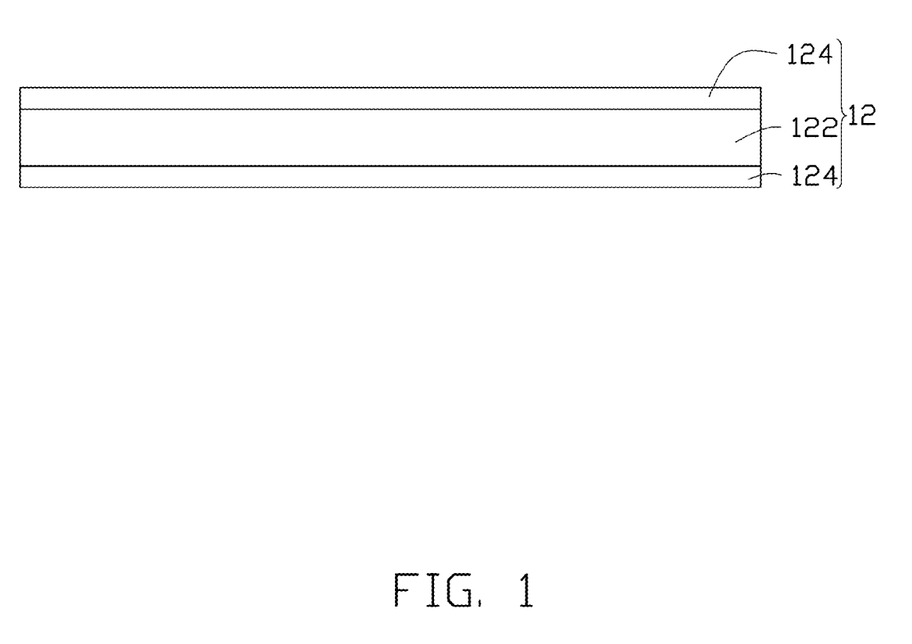
FIG. 1 shows a schematic view of a graphene film coated on a plastic support film in one embodiment of a current collector.
Figure 2:
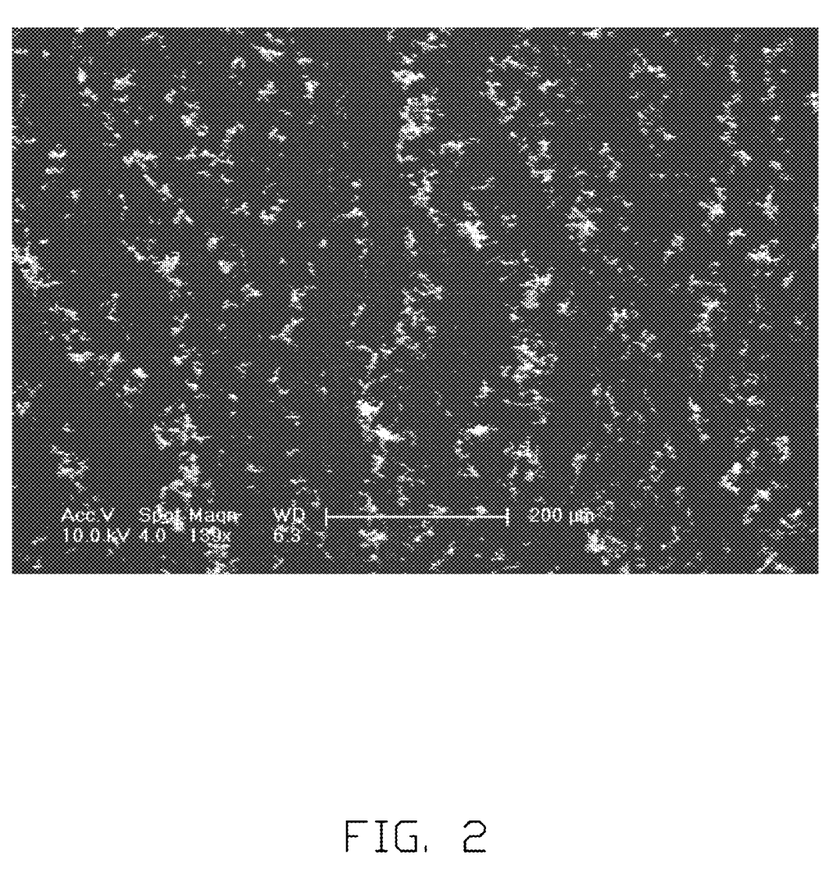
FIG. 2 is a scanning electron microscopic (SEM) image of the graphene film coated on the plastic support film in the embodiment of the current collector of FIG. 1.

The plastic support film 122 can be a continuous sheet shaped film, network shaped film or porous shaped film. The plastic support film 122 can support the graphene film 124 and an electrode material layer. A thickness of the plastic support film 122 can be in a range from about 1 micron (μm) to about 200 μm. The plastic support film 122 can be a continuous and integrated film structure. A material of the plastic support film 122 can have a small density and a good resistance to the corrosion of an electrolyte solution. The material of the plastic support film 122 can be polyethylene, polypropylene, polrvinyl chloride, polystyrene or acrylonitrile-butadiene-styrene common polymer.

The graphene film 124 can be a continuous film structure and can continuously cover at least one surface of the plastic support film 122. The graphene film 124 can directly contact the at least one surface of the plastic support film 122. The graphene film 124 and the plastic support film 122 can be pressed together by a pressure, thus, the graphene film 124 and the plastic support film 122 can be compactly combined with each other by an intermolecular force. In addition, the graphene film 124 and the plastic support film 122 can be compactly adhered together by an adhesive. In one embodiment, the graphene film 124 covers on two opposite surfaces of the plastic support film 122 substantially perpendicular to a thickness direction of the plastic support film 122. The graphene film 124 includes at least one graphene sheet. In one embodiment, the graphene film 124 includes a plurality of graphene sheets. The plurality of graphene sheets can be pieced together to form the graphene film 124 having a large area. The plurality of graphene sheets also can be stacked or overlapped with each other to form the graphene film 124 having a large thickness. The plurality of graphene sheets can be combined with each other by van der Waals attractive force. Each of the plurality of graphene sheets can include about one to ten layers of graphene. The graphene is a one-atom-thick planar sheet of $sp^2$-bonded carbon atoms that are densely packed in a honeycomb crystal lattice. A thickness of the graphene film 124 can be in a range from about 0.8 nanometers (nm) to about 5 μm. In one embodiment, the thickness of the graphene film 124 is in a range from about 0.8 nm to about 1 μm. In addition, the graphene film 124 can consist of pure graphene. In another embodiment, the graphene film 124 consists of only one graphene having the thickness of about 0.8 nm. The graphene can fully cover the surface of the plastic support film 122. In another embodiment, the graphene film 124 is composed of a plurality of graphene sheets having a thickness of 50 nm. The graphene has an excellent conductivity. A movement velocity of electrons in the graphene can reach to about 1/300 of a velocity of light which is much larger than the movement velocity of the electrons in other conductors. In addition, the graphene sheet has a large specific surface energy itself and can firmly combine with the plastic support film 122 and the electrode material layer by intermolecular force. Therefore, conductivity and electrochemical stability of the current collector 12 can be increased by covering the graphene film 124 on the surface of the plastic support film 122.

Figure 3:
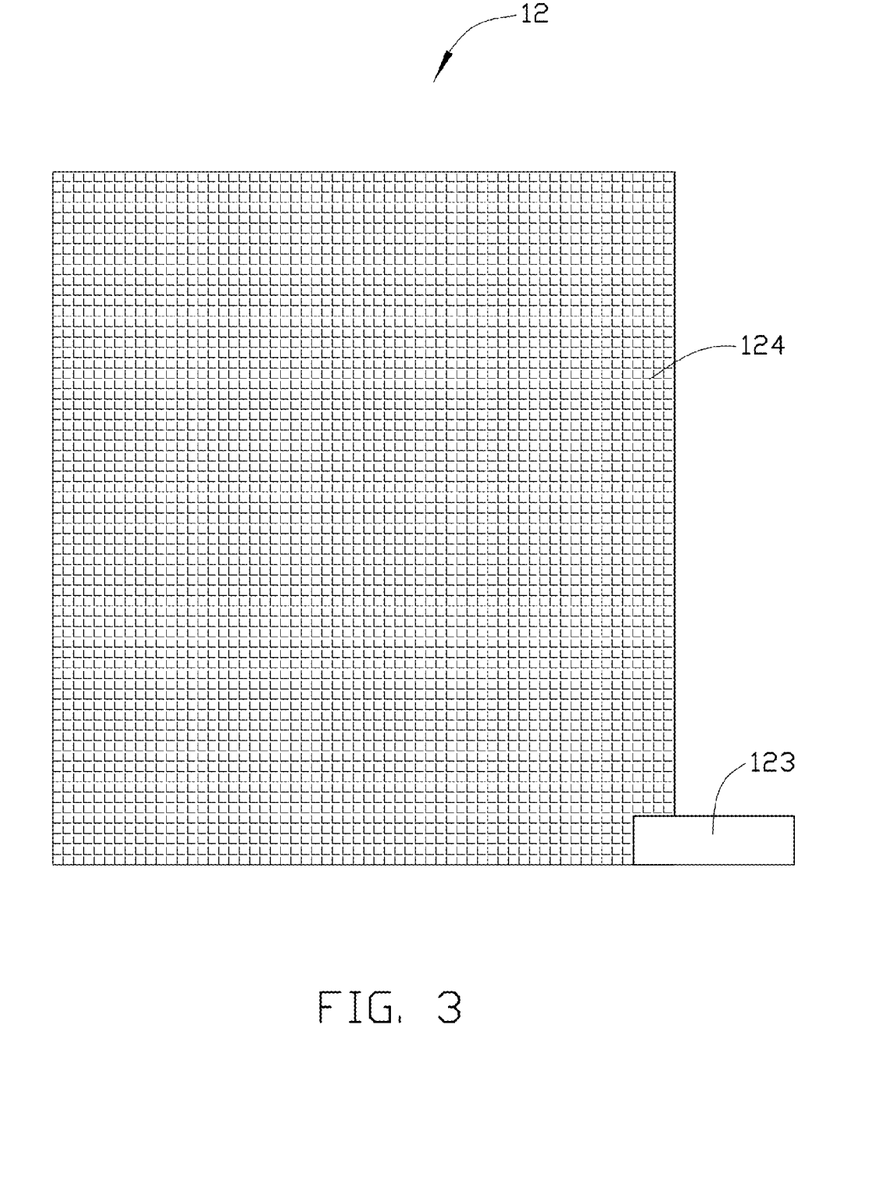
FIG. 3 is a top view of one embodiment of the current collector of FIG. 1 comprising connector tabs.
Figure 4:
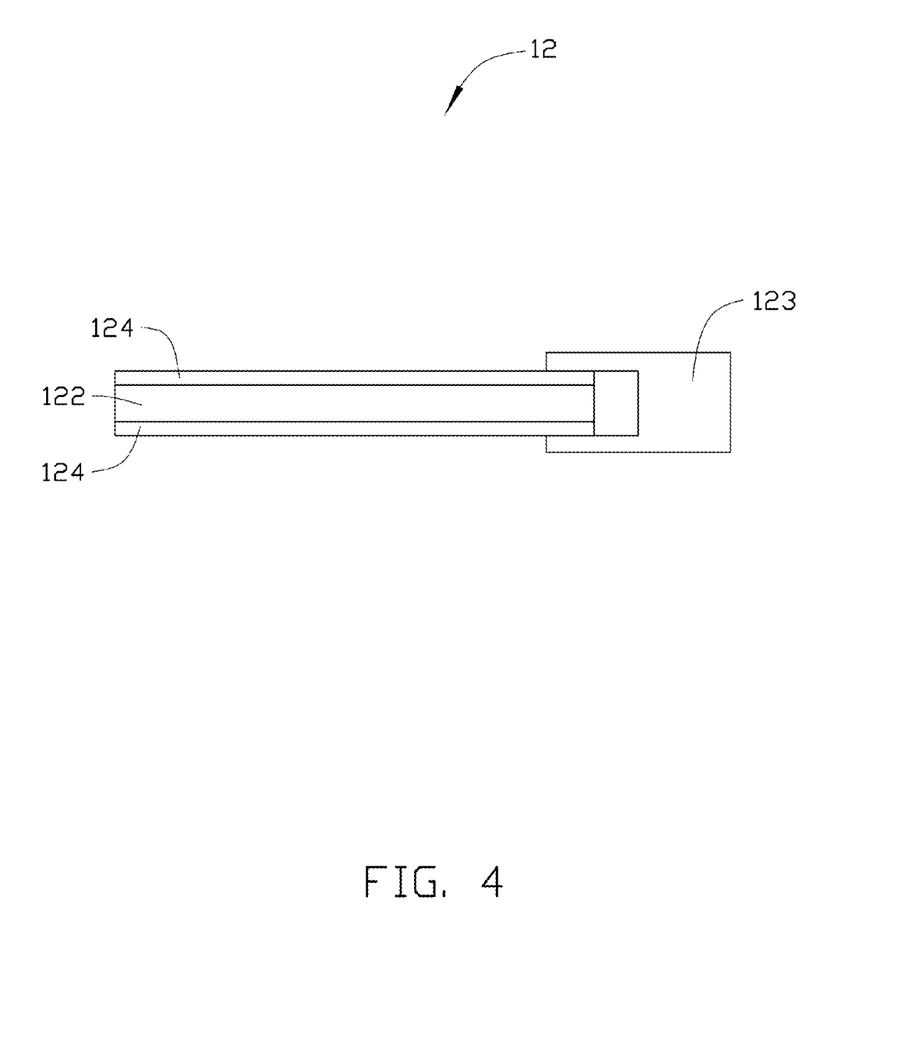
FIG. 4 is a side view of one embodiment of the current collector of FIG. 1 comprising connector tabs.

The current collector 12 can further include a connector tab 123 used to electrically connect with an external circuit. The connector tab 123 can be in contact with the graphene film 124 and protrude from the graphene film 124 and the plastic support film 122. Referring to FIG. 3, in one embodiment, the connector tab 123 is a conductive sheet having a narrow strip shape, the graphene film 124 covers on one surface of the plastic support film 122, and the connector tab 123 is directly disposed on the surface of the graphene film 124. Referring to FIG. 4, in another embodiment, the connector tab 123 is a "U" shaped conductor having two sheet shaped branches. Two opposite surfaces of the plastic support film 122 are covered by the graphene films 124. One branch of the connector tab 123 is disposed on one surface of the graphene film 124, and another branch of the connector tab 123 is disposed on another opposite surface of the graphene film 124. Thus, the connector tab 123 can be electrically connected with two graphene films 124 disposed on two opposite surfaces of the plastic support films 122. The connector tabs 123 can be adhered on the surfaces of the graphene film 124 by a conductive adhesive. A material of the connector tabs 123 can be a conductive material such as metal (e.g. copper or gold).

The current collector 12 can be fabricated by a solution coating method or a graphene transfer method. The graphene film 124, disposing on the plastic support film 122, having a large area or a large thickness can be fabricated by the solution coating method. The graphene film 124, disposing on the plastic support film 122, composed of a monolayer, continuous, and integrated graphene sheet can be fabricated by the graphene transfer method.

In one embodiment, the solution coating method for making the current collector 12 includes the following steps:

S1, providing a plurality of graphene sheets in powder form and dispersing the plurality of graphene sheets in a volatile solvent to form a graphene dispersion;

S2, coating the graphene dispersion on at least one surface of the plastic support film 122 to form a coating layer;

S3, removing the volatile solvent in the coating layer to form the graphene film 124.

In the step S1, the plurality of graphene sheets can be fabricated by a mechanical exfoliation method, oxidation-reduction method, or chemical vapor deposition method. The volatile solvent can be an organic solvent or water. The organic solvent can be at least one of ethanol, acetone, ether, and chloroform. The graphene dispersion can be stirred to make the plurality of graphene sheets uniformly dispersed in the volatile solvent. The stirring method can be at least one of magnetically stirring, mechanical stirring, and ultrasonically vibrating. A mass percentage of the plurality of graphene sheets to the graphene dispersion can be in a range from about 0.05 wt % to about 5 wt %. The larger the mass percentage of the graphene dispersion, the thicker the graphene film 124.

In the step S2, the coating method can be knife coating, brushing, spraying, electrostatic coating, roll coating, screen printing, or dip coating. In one embodiment, the graphene dispersion is dip coated on the surface of the plastic support film 122. The dip coating includes the steps of completely dipping the plastic support film 122 in the graphene dispersion, and then lifting the plastic support film 122 out from the graphene dispersion. A dipping time period can be in a range from about 30 seconds to about 5 minutes. A lifting speed can be in a range from about 1 centimeter per minute (1 cm/min) to about 20 cm/min. In one embodiment, the dipping time period is about 2 minutes, and the lifting speed is about 10 cm/min. Under an adhesion force and gravity of the graphene dispersion, the surface of the plastic support film 122 can be continuously coated with a graphene dispersion film during the lifting process. The graphene dispersion film has a uniform thickness. In addition, the steps of dipping and lifting can be repeated several times or the concentration of the graphene dispersion can be adjusted to control the thickness and uniformity of the coating layer.

In step S3, the volatile solvent can be removed by drying in a high temperature or in room temperature. The graphene can be firmly adhered on the surface of the plastic support film 122 due to a surface tension of the volatile solvent and specific surface energy of the graphene sheet. Therefore, a dense and continuous graphene film 124 can be formed on the surface of the plastic support film 122.

Figure 5:
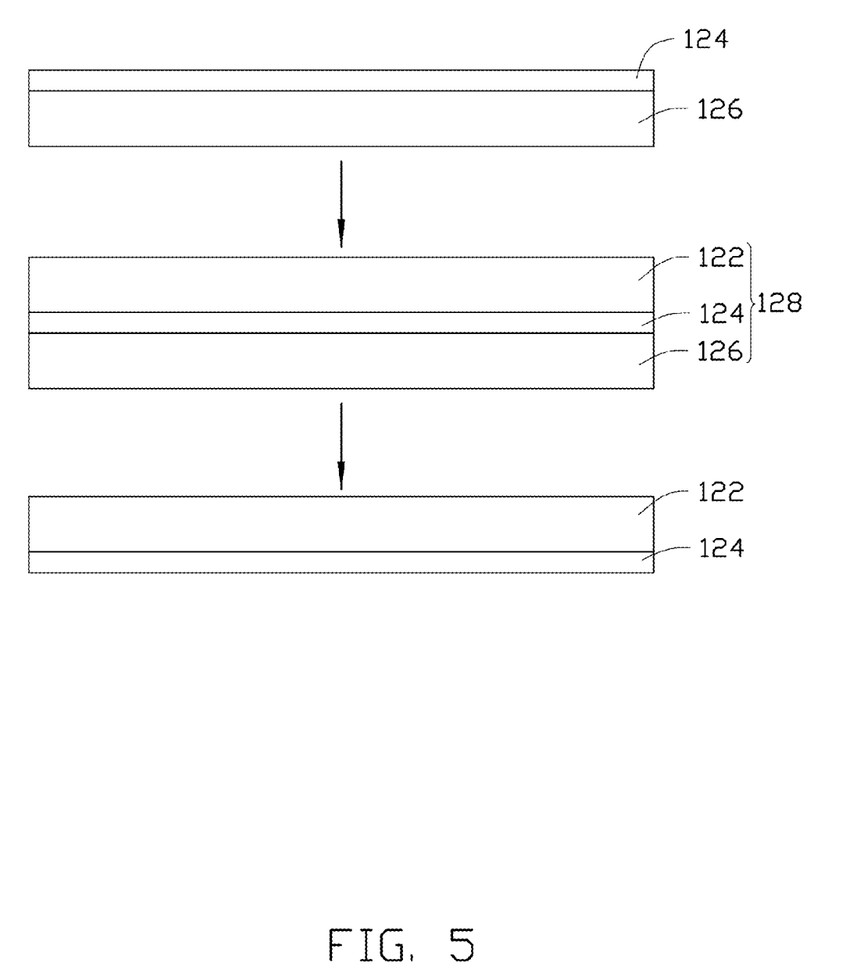
FIG. 5 is one embodiment of a process of covering the graphene film on the plastic support film using a graphene transfer method.

Referring to FIG. 5, the graphene transfer method for making the current collector 12 includes the following steps:

M1, providing a substrate 126 having a surface and disposing the graphene film 124 on the surface of the substrate 126;

M2, laminating the graphene film 126 disposed on the surface of the substrate 126 and the plastic support film 122 to form a substrate-graphene-plastic support film composite structure (SGPC) 128; and M3, removing the substrate 126.

In the step M1, a material of the substrate 126 can be metal or nonmetal. The metal can be copper or nickel. The nonmetal can be silicon oxide, glass or plastic. In one embodiment, the material of the substrate 126 is silicon oxide. The surface of the substrate 126 contacting the graphene film 124 is planar.

The graphene film 124 can be fabricated by chemical vapor deposition method, mechanical pressing method, or tearing from oriented graphite using a tape.

In one embodiment, the graphene film 124 is made by the mechanical pressing method. The mechanical pressing method includes:

N1, providing a graphite block, and cutting the graphite block to form a clean cleavage surface thereon;

N2, disposing the graphite block having the clean cleavage surface thereon on the substrate 126, wherein the cleavage surface is in contact with the substrate 126;

N3, applying a pressure on the graphite block for a predetermined period of time; and N4, removing the graphite block from the substrate 126 to form a graphene film 124 on the substrate 126.

In the step N1, the graphite block can be highly oriented pyrolytic graphite or natural flake graphite.

In the step N3, the pressure can be in a range from about 98 Pa to about 196 Pa. The pressure can be applied for about 5 minutes to about 10 minutes. The graphite has a laminar cleavage structure. The cleavage surface of the graphite has a poor molecular attraction. Thus, the graphene can be easily peeled off along the cleavage surface of the graphite under the pressure.

The graphene film 124 formed by the mechanical pressing method is a complete and continuous graphene sheet.

In the step M2, the plastic support film 122 and the graphene film 124 disposed on the surface of the substrate 126 are overlapped with each other to form a laminar structure. In the laminar structure, the plastic support film 122 is in contact with the graphene film 124. In one embodiment, the plastic support film 122, the graphene film 124 and the substrate 126 are combined by pressing the laminar structure under a pressure to form the SGPC 128. In the SGPC 128, the graphene film 124 and the plastic support film 122 are closely combined by intermolecular forces under the pressure. In another embodiment, the plastic support film 122 and the graphene film 124 are directly adhered to each other to form the SGPC 128.

In the step M3, the substrate 126 can be removed by solution corrosion method or etching method. In one embodiment, the substrate 126 is removed by solution corrosion method. The solution corrosion method includes the following steps: providing a NaOH solution; immersing the SGPC 128 in the NaOH solution to corrode the substrate 126 composed of silicon oxide, thereby forming a graphene-plastic support film composite structure; taking out the graphene-plastic support film composite structure from the NaOH solution; cleaning the graphene-plastic support film composite structure using deionized water; and drying the graphene-plastic support film composite structure, thereby forming the current collector 12.

Figure 6:
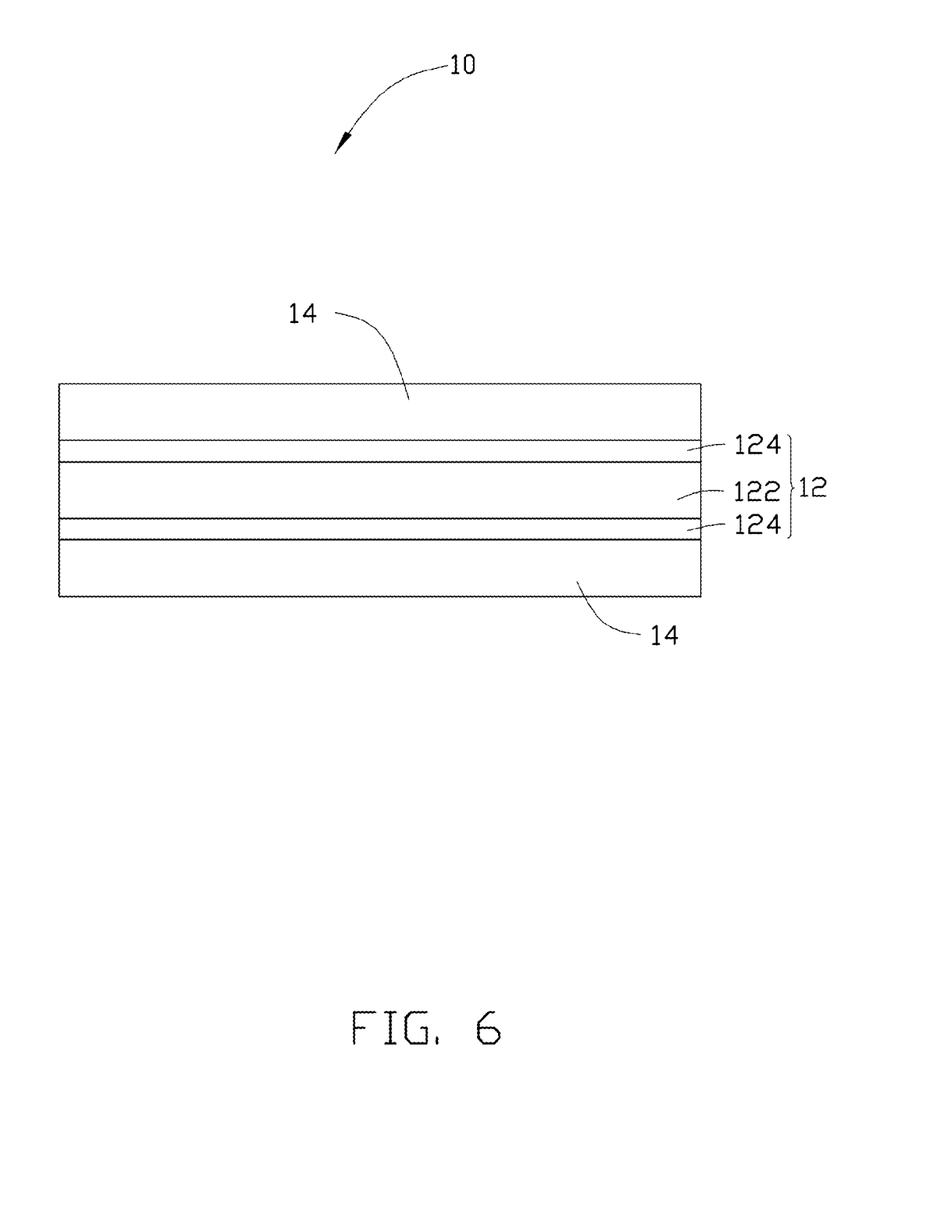
FIG. 6 is a schematic view of one embodiment of an electrochemical cell electrode.

Referring to FIG. 6, in one embodiment, an electrochemical cell electrode 10 using the current collector 12 is provided. The electrochemical cell electrode 10 includes the current collector 12 and an electrode material layer 14 covering on at least one surface of the current collector 12.

The electrode material layer 14 can be covered on the graphene film 124 disposing on two opposite surfaces of the current collector 12 along a thickness direction of the current collector 12. The electrode material layer 14 includes electrode active material, conductive agent and adhesive. The electrode active material, conductive agent and adhesive are uniformly mixed. The conductive agent in the electrode material layer 14 can be carbon fiber, acetylene black or carbon nanotube. The adhesive can be polyvinylidene fluoride, polytetrafluoroethylene, or styrene-butadiene rubber. The electrode active material can be a cathode active material or anode active material commonly used in the current electrochemical battery. The cathode active material can be doped or undoped spinel lithium manganese oxide, layered lithium manganese oxide, lithium nickel oxide, lithium cobalt oxide, lithium iron phosphate, lithium nickel manganese oxide, lithium nickel cobalt oxide, or any combination thereof. The anode active material can be natural graphite, organic cracking carbon, mesocarbon microbeads, or any combination thereof. The electrode material layer 14 can be firmly combined with graphene film 124 via the adhesive in the electrode material layer 14.

Figure 7:
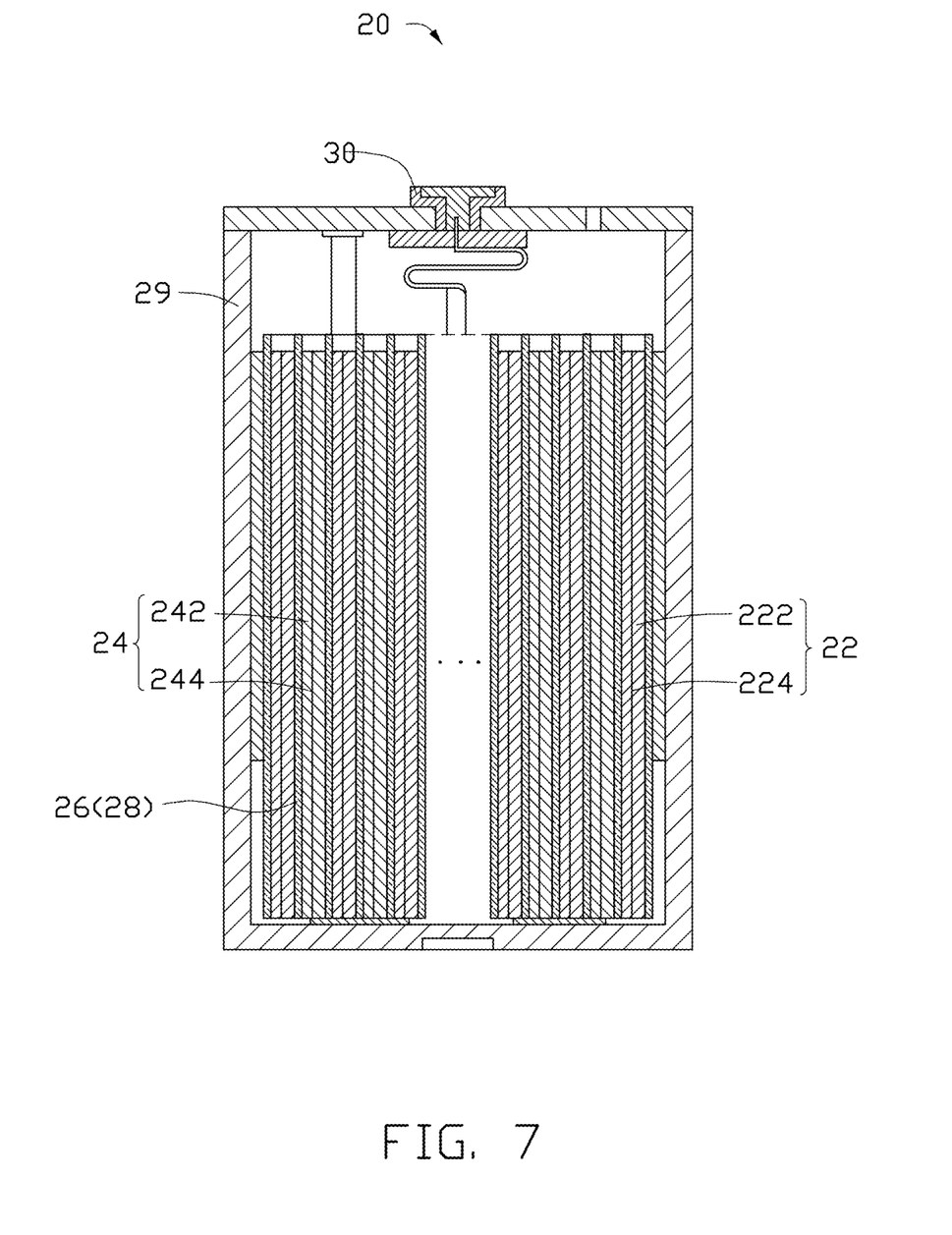
FIG. 7 is a schematic view of one embodiment of an electrochemical cell.

Referring to FIG. 7, in one embodiment, an electrochemical cell 20 is provided. The electrochemical cell 20 includes a cathode 22, an anode 24, a separator 26, and a nonaqueous electrolyte solution 28. The cathode 22 and the anode 24 are stacked with each other and sandwich the separator 26. The cathode 22 includes cathode current collector 222 and cathode material layer 224 formed on the surface of the cathode current collector 222. The anode 24 includes anode current collector 242 and anode material layer 244 formed on the surface of the anode current collector 242. The anode material layer 244 and the cathode material layer 224 are opposite to each other and separated by the separator 26. At least one of the cathode current collector 222 and the anode current collector 242 can use the above current collector 12.

The electrochemical cell 20 can further include an exterior encapsulating structure, such as a hard battery case 29 sealed by a sealing member 30, or a soft encapsulating bag, having the cathode 22, the anode 24, the separator 26 and the electrolyte solution 28 located therein.

In the electrochemical cell 20, the plastic support film 122 and the graphene film 124 in the current collector 12 have a small density and excellent corrosion resistance, thereby decreasing the weight and increasing the life of the electrochemical cell 20. In addition, the graphene film 124 has an excellent conductive and directly contacts the electrode material layer 14, thereby decreasing a contact resistance between the current collector 12 and the electrode material layer 14.

Furthermore, the electrochemical cell electrode 10 can be used in current different electrochemical cells, such as lithium ion battery, supercapacitor or nickel-cadmium battery.

EXAMPLE

Figure 8:
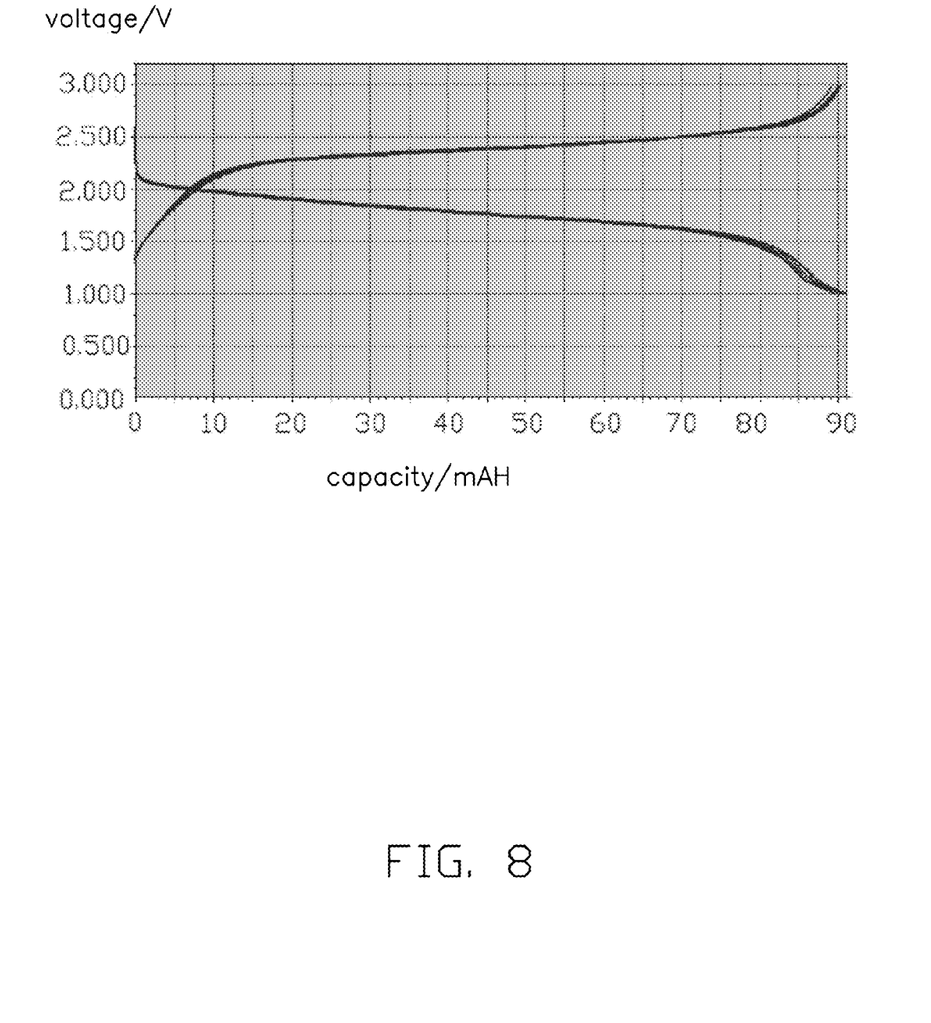
FIG. 8 is a test graph showing charge and discharge curves of one embodiment of a lithium ion battery.
Figure 9:
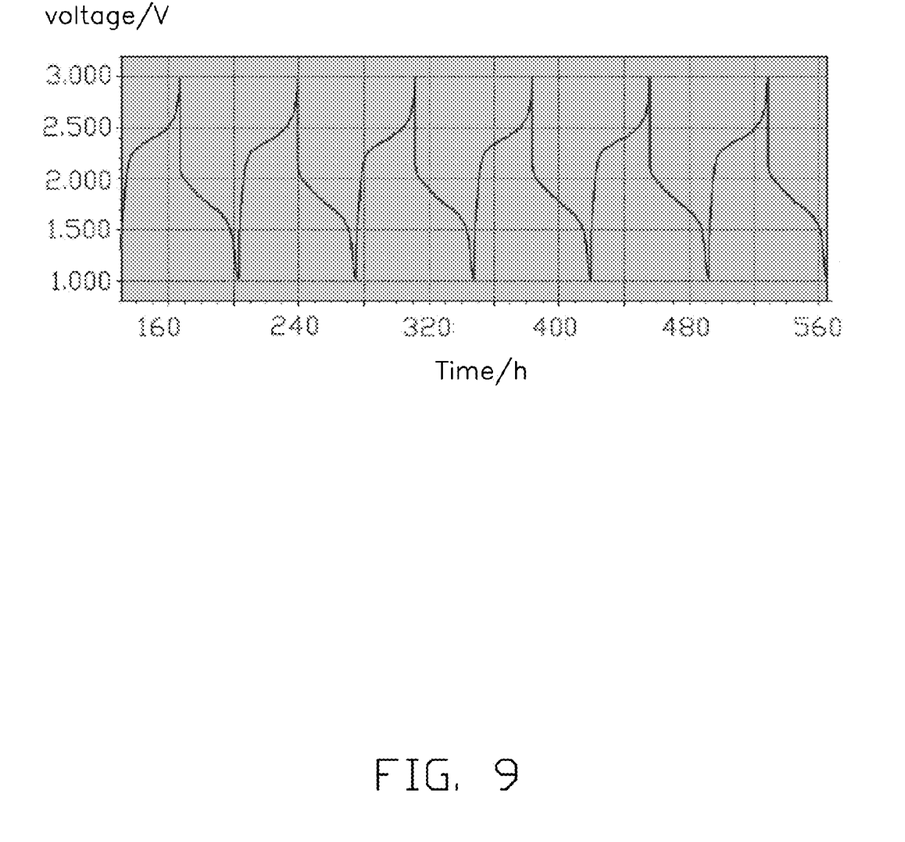
FIG. 9 is a test graph showing charge and discharge cycling performance of the lithium ion battery of FIG. 8.

In an exemplary embodiment of the lithium ion battery, the material of the plastic support film 122 of the current collector 12 in cathode is polyethylene. A thickness of the graphene film is about 100 nm. The cathode material layer is composed of lithium iron phosphate, conductive agent and adhesive mixed with each other. The mass percentage of the lithium iron phosphate is in a range from about 85% to about 98%. The mass percentage of the conductive agent is in a range from about 1% to about 10%. The mass percentage of the adhesive is in a range from about 1% to about 5%. The material of the anode is lithium metal. The electrolyte is formed by dissolving the lithium hexafluorophosphate ($LiPF_6$) in a solvent composed of ethylene carbonate (EC) and carbonic acid methyl ethyl ester (EMC). A molar concentration of the $LiPF_6$ is 1 mol/L. A volume ratio of EC to EMC is 1:1. FIG. 8 shows voltage-capacity curves in charge and discharge processes of the lithium ion battery. The lithium ion battery is charged to 3 V using a constant current of 2.5 mA, and then discharged to 1 V using the constant current of 2.5 mA. FIG. 9 shows a voltage-time curve in charge and discharge cycling processes of the lithium ion battery, the lithium ion battery is charged to 3 V using the constant current of 2.5 mA, and then discharged to 1 V using the constant current of 2.5 mA, the charge and discharge processes are repeatedly executed. According to FIG. 8 and FIG. 9, the lithium ion cell can be repeatedly charged or discharged for many times.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making an electrochemical cell comprising:
    making a current collector of the electrochemical cell comprising:
    providing a substrate, a graphene film, and a plastic support film, wherein the substrate has a surface, the plastic support film is resistive to a corrosion of an electrolyte solution of the electrochemical cell, and the graphene film is disposed on the surface of the substrate;
    laminating the graphene film disposed on the surface of the substrate and the plastic support film to form a substrate-graphene-plastic support film composite structure; and removing the substrate by a solution corrosion method or an etching method, wherein the current collector comprises the plastic support film and the graphene film coated on the plastic support film; and preparing an electrochemical cell electrode by covering an electrode material layer on the graphene film of the current collector;

wherein the graphene film is fabricated by a mechanical pressing method, and the mechanical pressing method comprises:

providing a graphite block, and cutting the graphite block to form a clean cleavage surface thereon;

disposing the graphite block having the clean cleavage surface thereon on the substrate, wherein the cleavage surface is in contact with the substrate;

applying a pressure on the graphite block for a predetermined period of time; and removing the graphite block from the substrate to form the graphene film on the substrate.

2. The method as claimed in claim 1, wherein the laminating the graphene film disposed on the surface of the substrate and the plastic support film comprises:

overlapping the graphene film disposed on the surface of the substrate and the plastic support film, wherein the graphene film is in contact with the plastic support film; and pressing the graphene film disposed on the surface of the substrate and the plastic support film by another pressure.

3. The method as claimed in claim 1, wherein the laminating the graphene film disposed on the surface of the substrate and the plastic support film comprises directly adhering the plastic support film to the graphene film.

4. The method as claimed in claim 1, wherein the pressure is in a range from about 98 Pa to about 196 Pa.

5. The method as claimed in claim 4, wherein the pressure is applied for about 5 minutes to about 10 minutes.

6. The method as claimed in claim 1, wherein a material of the substrate is silicon oxide.

7. The method as claimed in claim 2, wherein the graphene film and the plastic support film are combined by intermolecular forces in the substrate-graphene-plastic support film composite structure.

8. The method as claimed in claim 1, wherein the graphene film is a continuous and integrated graphene sheet.

9. The method as claimed in claim 1, wherein the plastic support film is a sheet shaped film, network shaped film, or porous shaped film.

10. The method as claimed in claim 1, wherein a material of the plastic support film is selected from the group consisting of polyethylene, polypropylene, polyvinyl chloride, polystyrene, acrylonitrile-butadiene-styrene common polymer and combination thereof.

11. The method as claimed in claim 1, wherein a thickness of the plastic support film is in a range from about 1 μm to about 200 μm.

* * * * *